United States Patent
Parisotto et al.

(10) Patent No.: US 12,353,976 B2
(45) Date of Patent: *Jul. 8, 2025

(54) GATED ATTENTION NEURAL NETWORKS

(71) Applicant: DeepMind Technologies Limited, London (GB)

(72) Inventors: Emilio Parisotto, London (GB); Hasuk Song, London (GB); Jack William Rae, London (GB); Siddhant Madhu Jayakumar, London (GB); Maxwell Elliot Jaderberg, London (GB); Razvan Pascanu, Letchworth Garden City (GB); Caglar Gulcehre, Lausanne (CH)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,200

(22) Filed: May 30, 2024

(65) Prior Publication Data
US 2024/0320469 A1 Sep. 26, 2024

Related U.S. Application Data

(63) Continuation of application No. 17/763,984, filed as application No. PCT/EP2020/074913 on Sep. 7, 2020, now Pat. No. 12,033,055.
(Continued)

(51) Int. Cl.
*G06N 3/044* (2023.01)
*G06N 3/048* (2023.01)
*G06N 3/08* (2023.01)

(52) U.S. Cl.
CPC ............. *G06N 3/044* (2023.01); *G06N 3/048* (2023.01); *G06N 3/08* (2013.01)

(58) Field of Classification Search
CPC .......... G06N 3/044; G06N 3/048; G06N 3/08; G06N 3/045; G06N 3/006; G06N 3/063;
(Continued)

(56) References Cited

U.S. PATENT DOCUMENTS

| 11,423,300 B1 | 8/2022 | Ritter |
| 11,568,207 B2 | 1/2023 | Van den Oord |
(Continued)

FOREIGN PATENT DOCUMENTS

| WO | WO 2018/131259 | 7/2018 |
| WO | WO 2019/084551 | 5/2019 |

OTHER PUBLICATIONS

Abdolmaleki et al, "Maximum a Posteriori Policy Optimisation," Proceedings of the 6th International Conference on Learning Representations, Vancouver, BC, Canada, Apr. 30-May 3, 2018, 22 pages.
(Continued)

*Primary Examiner* — Michael S Osinski
(74) *Attorney, Agent, or Firm* — Fish & Richardson P.C.

(57) ABSTRACT

A system including an attention neural network that is configured to receive an input sequence and to process the input sequence to generate an output is described. The attention neural network includes: an attention block configured to receive a query input, a key input, and a value input that are derived from an attention block input. The attention block includes an attention neural network layer configured to: receive an attention layer input derived from the query input, the key input, and the value input, and apply an attention mechanism to the query input, the key input, and the value input to generate an attention layer output for the attention neural network layer; and a gating neural network layer configured to apply a gating mechanism to the attention block input and the attention layer output of the atten-
(Continued)

tion neural network layer to generate a gated attention output.

20 Claims, 3 Drawing Sheets

Related U.S. Application Data (60) Provisional application No. 62/906,032, filed on Sep. 25, 2019.

(58) Field of Classification Search
CPC .......... G06N 3/084; G06N 3/047; G06N 3/04; G06N 5/04; G06N 3/0464; G06N 3/082; G06N 3/088; G06F 40/30; G06F 17/16; G06F 18/22; G06F 40/284; G06F 40/44; G06F 40/58; G06T 2207/20084; G06T 7/11; G06V 10/82; G06V 20/41
See application file for complete search history.

(56) References Cited

U.S. PATENT DOCUMENTS

| | | |
|---|---|---|
| 11,568,212 B2 | 1/2023 | Oztireli |
| 11,763,454 B2 | 9/2023 | Wang |
| 11,810,366 B1 | 11/2023 | Wang |
| 11,900,244 B1 | 2/2024 | Geno |
| 2017/0024645 A1 | 1/2017 | Socher et al. |
| 2017/0124432 A1 | 5/2017 | Chen |
| 2017/0262995 A1 | 9/2017 | Li |
| 2017/0262996 A1 | 9/2017 | Jain |
| 2018/0101767 A1 | 4/2018 | Huang |
| 2018/0329884 A1 | 11/2018 | Xiong |
| 2019/0130273 A1 | 5/2019 | Keskar |
| 2019/0258925 A1 | 8/2019 | Li |
| 2019/0266246 A1 | 8/2019 | Wang |
| 2019/0371307 A1 | 12/2019 | Zhao |
| 2020/0089755 A1 | 3/2020 | Shazeer |
| 2020/0311937 A1 | 10/2020 | Wang |
| 2021/0081503 A1 | 3/2021 | Tran |
| 2021/0271968 A1 | 9/2021 | Ganin |
| 2022/0172050 A1 | 6/2022 | Dalli |
| 2022/0246244 A1 | 8/2022 | Kappel |
| 2022/0351431 A1 | 11/2022 | Liu |
| 2022/0405480 A1 | 12/2022 | Huang |
| 2023/0090658 A1 | 3/2023 | Fang |

OTHER PUBLICATIONS

Abdolmaleki et al., "Relative Entropy Regularized Policy Iteration," CoRR, submitted on Dec. 5, 2018, arXiv:1812.02256, 23 pages.
An Empirical Study of Spatial Attention Mechanisms in Deep Networks; Zhu, Xizhou, arXiv:1904.05873v1 [cs.CV] Apr. 11, 2019 (Year: 2019).
Baevski et al., "Adaptive input representations for neural language modeling," CoRR, submitted on Sep. 28, 2018, arXiv:1809.10853, 13 pages.
Beattie et al., "Deepmind lab," CoRR, submitted on Dec. 12, 2016, arXiv:1612.03801, 11 pages.
Blundell et al., "Model-free episodic control," CoRR, submitted on Jun. 14, 2016, arXiv:1606.04460, 12 pages.
Buchlovsky et al., "TF-Replicator: Distributed Machine Learning for Researchers," CoRR, submitted on Feb. 1, 2019, arxiv:1902.00465, 12 pages.
Cho et al., "Learning phrase representations using rnn encoder-decoder for statistical machine translation," CoRR, submitted on Jun. 3, 2014, arXiv:1406.1078, 15 pages.
Chung et al., "Empirical evaluation of gated recurrent neural networks on sequence modeling," CoRR, submitted on Dec. 11, 2014, arXiv:1412.3555, 9 pages.
Cooijmans et al., "Recurrent batch normalization," CoRR, submitted on Mar. 30, 2016, arXiv:1603.09025v5 [cs.LG], 13 pages.
Czarnecki et al., "Mix&Match—Agent Curricula for Reinforcement Learning," CoRR, Jun. 5, 2018, arxiv.org/abs/1806.01780, 12 pages.
Dai et al., "Transformer-XL: Attentive language models beyond a fixed-length context," CoRR, submitted on Jan. 18, 2019, arXiv:1901.02860v2, 18 pages.
Dauphin et al., "Language modeling with gated convolutional networks," Proceedings of the 34th International Conference on Machine Learning, Sydney, NSW, Australia, Aug. 6-11, 2017, 70:933-941.
Decision to Grant a Patent in Japanese Appln. No. 2022-519017, dated Jul. 24, 2023, 5 pages.
Devlin et al., "Bert: Pre-training of deep bidirectional transformers for language understanding," Proceedings of the 2019 Conference of the North American Chapter of the Association for Computational Linguistics: Human Language Technologies, Jun. 2-7, 2019, 1:4171-4186.
Edunov et al., "Understanding back-translation at scale," In Proceedings of the 2018 Conference on Empirical Methods in Natural Language Processing, Oct. 31-Nov. 4, 2018, Brussels, Belgium, 1:489-500.
Espeholt et al., "Impala: Scalable distributed deep-rl with importance weighted actor-learner architectures," Proceedings of the 35th International Conference on Machine Learning, Stockholm, Sweden, Jul. 10-15, 2018, 80:1406-1415.
Glorot et al., "Understanding the difficulty of training deep feedforward neural networks," In Proceedings of the International Conference on Artificial Intelligence and Statistics (AISTATS10), Sardinia, Italy, May 13-15, 2010, 9:249-256, 8 pages.
Google.com [online], "Cloud Tensor Processing Units (TPU)," available online on orbefore May 17, 2017, retrieved on Aug. 21, 2023, retrieved from URL <https://cloud.google.com/tpu/>, 3 pages.
Graves et al., "Hybrid computing using a neural network with dynamic external memory," Nature, Oct. 2016, 538 (7626):471-476.
Graves, "Generating sequences with recurrent neural networks," CoRR, submitted on Aug. 2013, arXiv:1308.0850, 43 pages.
Gupta et al., "Cognitive mapping and planning for visual navigation," In Proceedings of the IEEE Conference on Computer Vision and Pattern Recognition, Honolulu, Hawaii, USA, Jul. 21-26, 2017, 2616-2625.
He et al., "Deep residual learning for image recognition," In Proceedings of the IEEE Conference on Computer Vision and Pattern Recognition, Las Vegas, NV, USA, Jun. 27-30, 2016, 770-778.
He et al., "Identity mappings in deep residual networks," In Proceedings of the 14th European Conference on Computer Vision, Amsterdam, The Netherlands, Oct. 11-14, 2016, 9908:630-645.
Hessel et al., "Multi-task Deep Reinforcement Learning with PopArt," CoRR, submitted on Sep. 2018, arXiv:1809.04474, 12 pages.
Hochreiter et al., "Long short-term memory," Neural Computation, Dec. 1997, 9(8):1735-1780.
Humplik et al., "Meta reinforcement learning as task inference," CoRR, submitted on May 2015, arXiv:1905.06424, 22 pages.
International Preliminary Report on Patentability in International Appln. No. PCT/EP2020/074913, dated Mar. 15, 2022, 8 pages.
International Search Report and Written Opinion in International Appln. No. PCT/EP2020/074913, dated Dec. 22, 2020, 11 pages.
Jaderberg et al., "Humanlevel performance in 3d multiplayer games with population-based reinforcement learning," Science, May 2019, 364(6443):859-865.
Kalchbrenner et al., "Grid long short-term memory," CoRR, submitted on Jul. 2015, arXiv:1507.01526, 15 pages.
Kapturowski et al., "Recurrent experience replay in distributed reinforcement learning," In Proceedings of International Conference on Learning Representations (ICLR), New Orleans, LA, May 6-9, 2019, 19 pages.
Krause et al., "Multiplicative LSTM for sequence modelling," CoRR, submitted on Sep. 2016, arXiv:1609.07959, 11 pages.
LeCun et al., "Efficient backprop," Neural Networks: Tricks of the Trade, Jan. 1998, 9-50.
Lei Ba et al., "Layer normalization," CoRR, Jul. 21, 2016, arXiv:1607.06450, 14 pages.

(56) References Cited

OTHER PUBLICATIONS

Liu et al., "Generating wikipedia by summarizing long sequences," CoRR, submitted on Jan. 2018, arXiv:1801.10198, 18 pages.
Liu et al., "Text summarization with pretrained encoders," Proceedings of the 2019 Conference on Empirical Methods in Natural Language Processing and 9th International Joint Conference on Natural Language Processing, Hong Kong, China, Nov. 3-7, 2019, 3730-3740, 11 pages.
Miconi et al., "Differentiable plasticity: training plastic neural networks with backpropagation," Proceedings of the 35th International Conference on Machine Learning, Stockholm, Sweden, Jul. 10-15, 2018, 80:3556-3565.
Mishra et al., "A Simple Neural Attentive Meta-Learner," Proceedings of 6th International Conference on Learning Representations, Vancouver, BC, Canada, Apr. 30-May 3, 2018, 17 pages.
Mnih et al., "Asynchronous methods for deep reinforcement learning," Proceedings of the 33rd International Conference on Machine Learning, New York, NY, USA, Jun. 20-22, 2016, 48:1928-1937.
Neunert et al., "Continuous-Discrete Deep Reinforcement Learning for Hybrid Control in Robotics," In Proceedings of the 3rd Conference on Robot Learning (CoRL 2019), Osaka, Japan, Oct. 30-Nov. 1, 2019, 17 pages.
Office Action in European Appln. No. 20702116.3, dated May 27, 2024, 9 pages.
Office Action in European Appln. No. 20768551.2, dated Mar. 21, 2024, 6 pages.
Parisotto et al., "Neural map: Structured memory for deep reinforcement learning," Proceedings of the 6th International Conference on Learning Representations, Vancouver, BC, Canada, Apr. 30-May 3, 2018, 20 pages.
Parisotto et al., "Stabilizing Transformers for Reinforcement Learning," Proceedings of the 37th International Conference on Machine Learning, online, Jul. 13-18, 2020, 12 pages.
Pritzel et al., "Neural episodic control," Proceedings of the 34th International Conference on Machine Learning, Sydney, NSW, Australia, Aug. 6-11, 2017, 70:2827-2836.
Radford et al., "Language models are unsupervised multitask learners," OpenAI Blog, 2019, 8(9), 24 pages.
Rumelhart et al., "Parallel distributed processing: Explorations in the microstructure of cognition," The MIT Press, 1986, 1(2):45-76.
Santoro et al., "Relational recurrent neural networks," Proceedings of the 32nd International Conference on Neural Information Processing Systems, Montreal, Canada, Dec. 3-8, 2018, 7299-7310, 12 pages.
Song et al., "V-MPO: On-Policy Maximum a Posteriori Policy Optimization for Discrete and Continuous Control," CoRR, submitted on Sep. 26, 2019, arXiv:1909.12238, 19 pages.
Srivastava et al., "Highway networks," CoRR, submitted on May 2015, arXiv:1505.00387, 6 pages.
Stooke et al., "Perception-prediction-reaction agents for deep reinforcement learning," CoRR, submitted on Jun. 2020, arXiv:2006.15223, 14 pages.
Sutskever et al., "On the importance of initialization and momentum in deep learning," Proceedings of the 30th International Conference on Machine Learning, Atlanta, Georgia, USA, Jun. 17-19, 2013, 28:1139-1147.
Uchibe et al., "Cooperative and Competitive Reinforcement and Imitation Learning for a Mixture of Heterogeneous Learning Modules," Frontiers in Neurorobotics, Sep. 27, 2018, 12(61):61-61.
Van den Oord et al., "Conditional image generation with PixelCNN decoders," Advances in Neural Information Processing Systems, Jun. 2016, 29:4790-4798.
Vaswani et al., "Attention is all you need," Advances in Neural Information Processing Systems 30, 2017, 5998-6008.
Vinyals et al., "AlphaStar: Mastering the Real-Time Strategy Game StarCraft II," Jan. 2019, retrieved on Aug. 21, 2023, retrieved from URL<https://deepmind.com/blog/alphastar-mastering-real-time-strategy-game-starcraft-ii/>, 12 pages.
Wayne et al., "Unsupervised predictive memory in a goal-directed agent," CoRR, submitted on Mar. 2018, arXiv:1803.10760, 57 pages.
Wu et al. "On multiplicative integration with recurrent neural networks," Advances in Neural Information Processing Systems, Jun. 2016, 29:2856-2864.
Yang et al., "Xlnet: Generalized autoregressive pretraining for language understanding," Advances in Neural Information Processing Systems 32: Annual Conference on Neural Information Processing Systems 2019, Vancouver, BC, Canada, Dec. 8-14, 2019, 11 pages.
Zilly et al., "Recurrent highway networks," In Proceedings of the 34th International Conference on Machine Learning, Sydney, NSW, Australia, Aug. 6-11, 2017, 70:4189-4198.
Zoph et al., "Neural architecture search with reinforcement learning," CoRR, submitted on Nov. 2016, arXiv:1611.01578, 16 pages.

GATED ATTENTION NEURAL NETWORKS

CROSS REFERENCE TO RELATED APPLICATIONS

This application is a continuation of U.S. patent application Ser. No. 17/763,984, filed on Mar. 25, 2022, which is a National Stage Application under 35 U.S.C. § 371 and claims the benefit of International Patent Application No. PCT/EP2020/074913, filed on Sep. 7, 2020, which claims priority to U.S. Provisional Patent Application No. 62/906,032, filed on Sep. 25, 2019, the entire contents of which are hereby incorporated by reference.

BACKGROUND

This specification relates to a system that processes an input sequence to generate an output using an attention neural network.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network system implemented as computer programs on one or more computers in one or more locations that includes an attention neural network configured to receive an input sequence and to process the input sequence to generate an output.

The attention neural network may comprise an attention block configured to receive a query input, a key input, and a value input that are derived from an attention block input. The attention block may comprise an attention neural network layer.

The attention neural network layer may be configured to receive an attention layer input derived from the query input, the key input, and the value input, and apply an attention mechanism to the attention layer input to generate an attention layer output for the attention neural network layer.

The attention block may further comprise a gating neural network layer configured to apply a gating mechanism to the attention block input and the attention layer output of the attention neural network layer to generate a gated attention output. The attention block input may, for example, be embeddings from the output of a previous attention block in the attention neural network or embeddings derived from the input sequence or the input sequence itself.

The attention block may further comprise a first layer normalization layer configured to apply a layer normalization operation to the query input, the key input, and the value input to generate a normalized query input, a normalized key input, and a normalized value input. The attention layer input may comprise the normalized query input, the normalized key input, and the normalized value input.

Applying the gating mechanism on the attention block input and the attention layer output may comprise one or more of the following: applying a sigmoid modulation to the attention block input to generate a first sigmoid modulated output and combining the first sigmoid modulated output with the attention layer output to generate the gated attention output; and/or applying a sigmoid modulation to the attention layer output to generate a second sigmoid modulated output and combining the second sigmoid modulated output with the attention block input to generate the gated attention output; and/or computing a combination of the attention block input and the attention layer output using a sigmoid weighting to generate the gated attention output; and/or applying a sigmoid and a tan h activation on the attention layer output to generate a sigmoid-tan h output and combining the sigmoid-tan h output with the attention block input to generate the gated attention output; and/or applying a gated recurrent unit on the attention block input and the attention layer output. It will be appreciated that applying a sigmoid modulation may be applying a sigmoid activation function. It will be further appreciated that the combination of the attention block input and the attention layer output using a sigmoid weighting to generate the gated attention output may be a convex combination.

The attention block may further comprise a second layer normalization layer configured to apply a layer normalization operation to the gated attention output to generate a normalized-gated attention output. The attention block may further comprise one or more feedforward neural network layers configured to apply one or more transformations to the normalized-gated attention output to generate a temporary attention block output. The attention block may further comprise a second gating neural network layer configured to apply a second gating mechanism to the temporary attention block output and the gated attention output to generate a final attention block output for the attention block.

The attention mechanism may be a self-attention mechanism. The attention mechanism may be a masked self-attention mechanism. A masked self-attention mechanism is an attention mechanism that is masked so that it does not attend over or otherwise process any data that is not at a position preceding the current position in the attention layer input sequence. That is, the masked self-attention attends over or processes data in a position preceding the current position in the attention layer sequence.

The input sequence may be a training input sequence. The attention neural network may process the training input sequence to generate an output for the training input sequence. The output for the training input sequence may be used as part of an objective function for training the attention neural network. The training input sequence and objective function may be selected as appropriate according to a training task. The system may be further configured to train the attention neural network.

According to another aspect, there is provided one or more computer storage media storing instructions that, when executed by one or more computers, cause the one or more computers to implement the attention neural network described above.

According to a further aspect, there is provided a method comprising the operations that the attention neural network described above is configured to perform.

It will be appreciated that features described in the context of one aspect may be combined with features described in the context of another aspect.

Particular embodiments of the subject matter described in this specification can be implemented so as to realize one or more of the following advantages. By replacing a residual connection in an attention neural network with a gating function, the techniques described herein allow the training of the attention neural network to become much more stable and improve learning speeds. Training of the attention neural network may therefore require fewer computational resources, e.g. reduced processor cycles, reduced wall clock time, reduced power consumption, and the computational efficiency of training is therefore improved. In addition, the final performance of the network may also be improved. The final performance of the network is also robust against hyperparameter selections and variations caused by different random seeds. These techniques allow the attention neural network to achieve good results in domains, e.g., reinforcement learning, where the conventional attention neural network could not. For example, conventional attention neural networks used in reinforcement learning have in some cases only achieved performance comparable to a random policy. Additionally, these techniques can modify how a layer normalization operation is applied within an attention block to allow the attention block to be initialized to an identity operation at the beginning of training. This modification can be particularly advantageous in a reinforcement learning setting because it allows a robotic agent to begin being control by a purely reactive policy and learn to use longer horizon information as learning goes on, providing a further speed up to the learning speed. That is, the agent may first learn reactive behaviors prior to memory-based behaviors.

These techniques are also more scalable enabling larger and/or deep networks to be learned in order to handle more complex problems and environments.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a neural network system implemented as computer programs on one or more computers in one or more locations that includes an attention neural network including one or more attention blocks. The neural network system is configured to receive an input sequence and to process the input sequence to generate an output.

For example, the neural network system may be a reinforcement learning system that selects actions to be performed by a reinforcement learning agent interacting with an environment. In order for the agent to interact with the environment, the system may receive an input sequence that includes a sequence of observations characterizing different states of the environment. The system may generate an output that specifies one or more actions to be performed by the agent in response to the received input sequence, i.e., in response to the last observation in the sequence. That is, the sequence of observations includes a current observation characterizing the current state of the environment and one or more historical observations characterizing past states of the environment.

In some implementations, the environment is a real-world environment and the agent is a mechanical agent interacting with the real-world environment. For example, the agent may be a robot interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation such as steering, and movement, e.g. braking and/or acceleration of the vehicle.

In some implementations the environment is a simulated environment and the agent is implemented as one or more computers interacting with the simulated environment. Training an agent in a simulated environment may enable the agent to learn from large amounts of simulated training data while avoiding risks associated with training the agent in a real world environment, e.g., damage to the agent due to performing poorly chosen actions. An agent trained in a simulated environment may thereafter be deployed in a real-world environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a chemical synthesis or a protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

In some applications the agent may be a static or mobile software agent i.e. a computer programs configured to operate autonomously and/or with other software agents or people to perform a task. For example the environment may be an integrated circuit routing environment and the system may be configured to learn to perform a routing task for routing interconnection lines of an integrated circuit such as an ASIC. The rewards (or costs) may then be dependent on one or more routing metrics such as an interconnect resistance, capacitance, impedance, loss, speed or propagation delay, physical line parameters such as width, thickness or geometry, and design rules. The observations may be observations of component positions and interconnections; the actions may comprise component placing actions e.g. to define a component position or orientation and/or interconnect routing actions e.g. interconnect selection and/or placement actions. The routing task may thus comprise placing components i.e. determining positions and/or orientations of components of the integrated circuit, and/or determining a routing of interconnections between the components. Once the routing task has been completed an integrated circuit, e.g. ASIC, may be fabricated according to the determined placement and/or routing. Or the environment may be a data packet communications network environment, and the agent be a router to route packets of data over the communications network based on observations of the network.

Generally, in the case of a simulated environment, the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

In general, in the above described applications, where the environment is a simulated version of a real-world environment, once the system/method has been trained in the simulation it may afterwards be applied to the real-world environment. That is, control signals generated by the system/method may be used to control the agent to perform a task in the real-world environment in response to observations from the real-world environment. Optionally the system/method may continue training in the real-world environment based on one or more rewards from the real-world environment.

Optionally, in any of the above implementations, the observation at any given time step may include data from a previous time step that may be beneficial in characterizing the environment, e.g., the action performed at the previous time step, the reward received at the previous time step, and so on.

In another example, the neural network system may be a neural machine translation system. That is, if the input sequence is a sequence of words in an original language, e.g., a sentence or phrase, the output may be a translation of the input sequence into a target language, i.e., a sequence of words in the target language that represents the sequence of words in the original language.

As another example, the neural network system may be a speech recognition system. That is, if the input sequence is a sequence of audio data representing a spoken utterance, the output may be a sequence of graphemes, characters, or words that represents the utterance, i.e., is a transcription of the input sequence.

As another example, the system may be a natural language processing system. For example, if the input sequence is a sequence of words in an original language, e.g., a sentence or phrase, the output may be a summary of the input sequence in the original language, i.e., a sequence that has fewer words than the input sequence but that retains the essential meaning of the input sequence. As another example, if the input sequence is a sequence of words that form a question, the output can be a sequence of words that form an answer to the question. As another example, the task can be a natural language understanding task, e.g., an entailment task, a paraphrase task, a textual similarity task, a sentiment task, a sentence completion task, a grammaticality task, and so on, that operates on a sequence of text in some natural language to generate an output that predicts some property of the text.

As another example, the system may be part of a computer-assisted medical diagnosis system. For example, the input sequence can be a sequence of data from an electronic medical record and the output can be a sequence of predicted treatments.

As another example, the system may be part of an image processing system. For example, the input sequence can be an image, i.e., a sequence of color values from the image, and the output can be a sequence of text that describes the image. As another example, the input sequence can be a sequence of text or a different context and the output can be an image that describes the context.

Figure 1:
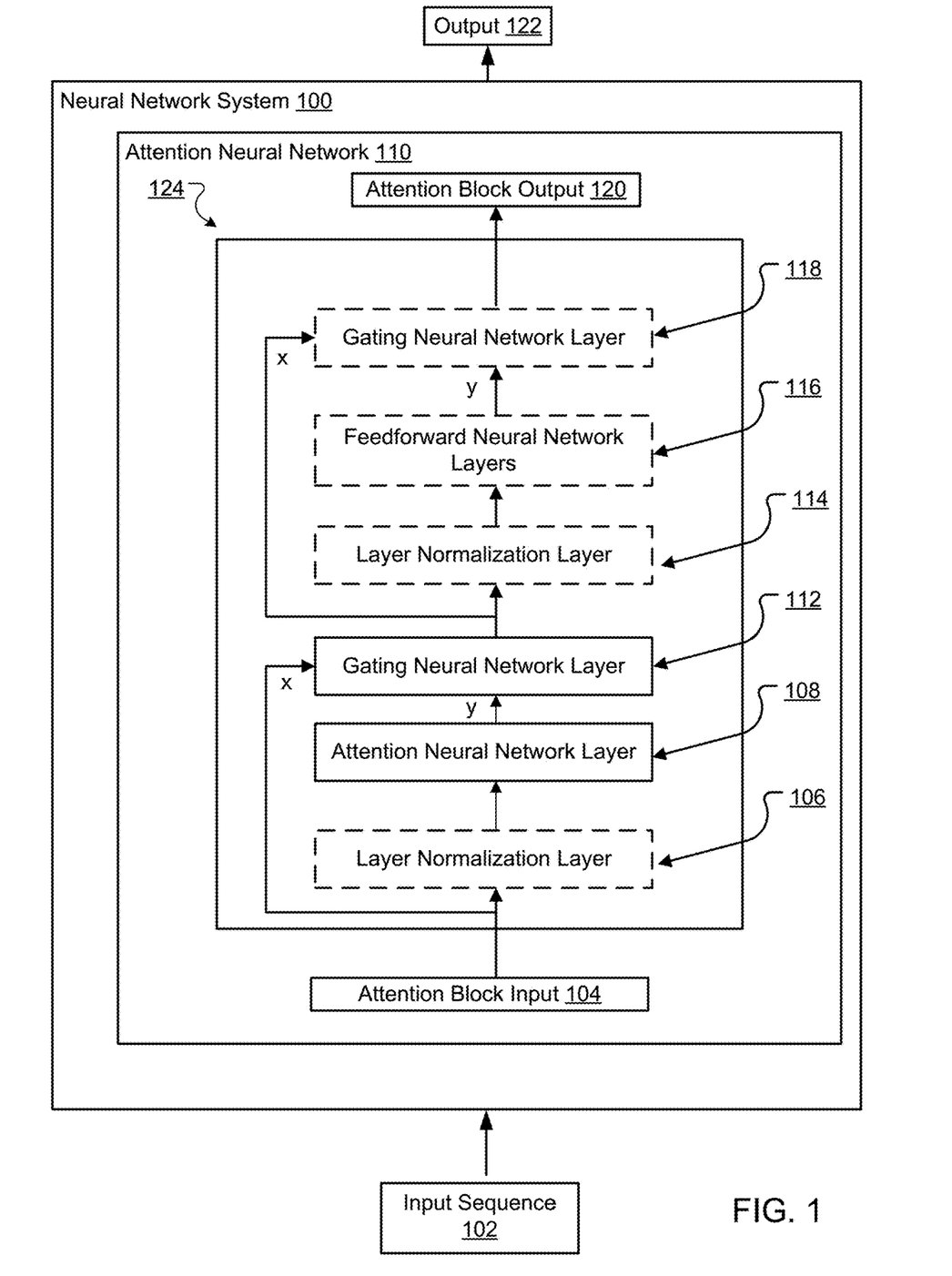
FIG. 1 shows an example neural network system including an attention neural network that includes an attention block.

FIG. 1 shows an example neural network system 100. The neural network system 100 is an example of a system implemented as computer programs on one or more computers in one or more locations, in which the systems, components, and techniques described below can be implemented.

The neural network system 100 receives an input sequence 102 and processes the input sequence 102 to generate an output 122. The neural network system 100 includes an attention neural network 110. The attention neural network 110 includes an attention block 124.

While FIG. 1 illustrates one attention block 124, the attention neural network 110 may include multiple attention blocks arranged in a stack one after the other and, optionally, other components. Particular examples of architectures of attention neural networks that include multiple attention blocks and that can be modified to include attention blocks of the type described in this specification (e.g., the type of attention block 124) are described in Jacob Devlin, Ming-Wei Chang, Kenton Lee, and Kristina Toutanova. Bert: Pre-training of deep bidirectional transformers for language understanding. In Proceedings of the 2019 Conference of the North American Chapter of the Association for Computational Linguistics: Human Language Technologies, Volume 1 (Long and Short Papers), pp. 4171-4186, 2019; Zihang Dai, Zhilin Yang, Yiming Yang, Jaime Carbonell, Quoc Le, and Ruslan Salakhutdinov. Transformer-XL: Attentive language models beyond a fixed-length context. In Proceedings of the 57th Annual Meeting of the Association for Computational Linguistics, pp. 2978-2988, Florence, Italy, July 2019. Association for Computational Linguistics. doi: 10.18653/v1/P19-1285. URL https://www.aclweb.org/anthology/P19-1285; and Ashish Vaswani, Noam Shazeer, Niki Parmar, Jakob Uszkoreit, Llion Jones, Aidan N. Gomez, Lukasz Kaiser, and Illia Polosukhin. Attention is all you need. Advances in Neural Information Processing Systems, pp. 5998-6008, 2017. URL https://papers.nips.cc/paper/7181-attention-is-all-you-need.pdf.

Figure 2:
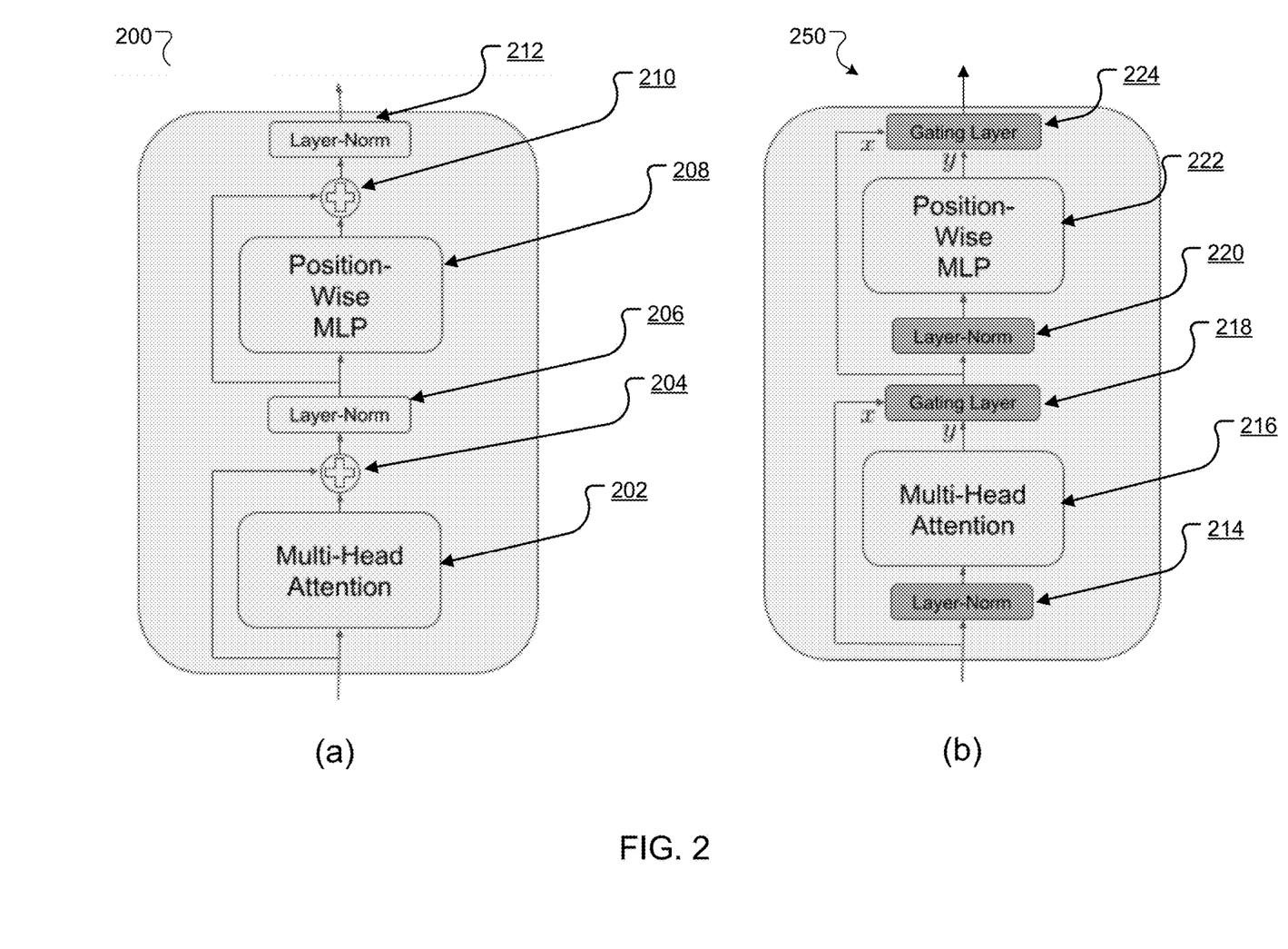
FIG. 2 illustrates how a conventional attention block can be modified to include an attention block of the type described in this specification.

FIG. 2 illustrates how a conventional attention block can be modified to include an attention block of the type described in this specification.

As shown in FIG. 2(a), generally, a conventional attention block 200 (also referred to as "a transformer block") within a conventional attention neural network (or a "transformer neural network") includes two submodules: an attention neural network layer (e.g., a multi-head attention neural network layer 202) followed by a feedforward neural network (e.g., a position-wide multi-layer perceptron network 208). The input to the transformer block 200 is an embedding(s) from the previous block $E^{(l-1)} \in \mathbb{R}^{T \times D}$ of the attention neural network, where T is the number of time steps, D is the hidden dimension, and $L \in [0, L]$ is the block index with L being the total number of transformer blocks of the attention neural network. It can be assumed that E(0) is an input embedding of dimension [T,D], e.g. a word embedding in the case of language modeling or an embedding of the per-timestep observations in a reinforcement learning environment.

The example transformer block 200 in FIG. 2 includes a multi-head attention (MHA) neural network layer 202 that computes in parallel h soft-attention operations on input $E^{(l-1)}$ for every time step:

$$\overline{Y}^{(l)} = \text{MultiHeadAttention}(E^{(l-1)}). \quad (1)$$

In particular, to implement multi-head attention, the layer 202 applies h different attention mechanisms in parallel. In other words, the MHA neural network layer 202 includes h different attention sub-layers, with each attention sub-layer receiving the same original queries Q, original keys K, and original values V. These original queries Q, original keys K, and original values K are derived from the input of the transformer block.

Each attention sub-layer is configured to transform the original queries, and keys, and values using learned linear transformations and then apply an attention mechanism to the transformed queries, keys, and values. Each attention sub-layer will generally learn different transformations from each other attention sub-layer.

In particular, each attention sub-layer is configured to apply a learned query linear transformation to each original query to generate a layer-specific query for each original query, apply a learned key linear transformation to each original key to generate a layer-specific key for each original key, and apply a learned value linear transformation to each original value to generate a layer-specific values for each original value. The attention sub-layer then applies the attention mechanism using these layer-specific queries, keys, and values to generate initial outputs for the MHA neural network layer 202.

The MHA neural network layer 202 then combines the initial outputs of the attention sub-layers to generate the final output of the layer 202. For example, the layer 202 concatenates the initial outputs of the attention sub-layers and applies a learned linear transformation to the concatenated output to generate the output of the layer 202.

Multi-head attention is described in more detail in Ashish Vaswani, Noam Shazeer, Niki Parmar, Jakob Uszkoreit, Llion Jones, Aidan N. Gomez, Lukasz Kaiser, and Illia Polosukhin. Attention is all you need. Advances in Neural Information Processing Systems, pp. 5998-6008, 2017.

After the output of the MHA neural network layer 202 is generated, a residual connection 204 and layer normalization 206 are then applied to the output $\overline{Y}^{(l)}$ of the multi-head attention neural network layer 202 as follows:

$$\hat{Y}^{(l)} = E^{(l-1)} + \overline{Y}^{(l)}, Y^{(l)} = \text{LayerNorm}(\hat{Y}^{(l)}), \quad (2)$$

The transformer block 200 further includes a position-wise multi-layer perception (MLP) network 208 that applies a 1×1 temporal convolutional network $f^{(l)}$ (i.e., kernel size 1, stride 1) over every step in the sequence, producing a new embedding tensor $\bar{E}^{(l)} \in \mathbb{R}^{T \times D}$:

$$\bar{E}^{(l)} = f^{(l)}(Y^{(l)}). \tag{3}$$

After the MLP network 208, there is an update by a residual connection 210 followed by an update by a layer normalization layer 212:

$$\hat{E}^{(l)} = Y^{(l)} + \bar{E}^{(l)}, E^{(l)} = \text{LayerNorm}(\hat{E}^{(l)}). \tag{4}$$

In order to allow the training of an attention neural network to become much more stable and to improve learning speeds, the new type of attention blocks described in this specification has a gating mechanism (or a gating function) that replaces a residual connection in conventional transformer blocks. For example, FIG. 2(b) shows a new attention block 250 that was modified based on the transformer block 200 according to the techniques described in this specification. In FIG. 2(b), a gating neural network layer 218 and a gating neural network layer 224 replace a residual connection 204 and a residual connection 210 in the transformer block 200, respectively. This technique allows the attention neural network to achieve good results in domains, e.g., reinforcement learning, where the conventional attention neural network could not. Additionally, in the type of attention blocks described in this specification, the layer normalization layers in conventional transformer blocks are reordered such that layer normalization is only applied to the input stream of each of the submodules. For example, as shown in FIG. 2(b), the layer normalization layer 214 is applied to the input stream of the multi-head attention neural network layer 216, and the layer normalization layer 220 is applied to the input stream of the position-wise MLP network 222. This is different from the layer normalization layers 206 and 212 being applied to the output stream of the multi-head attention neural network layer 202 and the output stream of the position-wise MLP network 208 of the transformer block 200 in FIG. 2(a), respectively. A key benefit to this reordering is that it now enables an identity map from the input of the transformer at the first layer to the output of the transformer after the last layer. This is in contrast to the conventional transformer, where there are a series of layer normalization operations that non-linearly transform the state encoding. This modification can be particularly advantageous in a reinforcement learning setting because it allows a robotic agent to begin being control by a purely reactive policy and learn to use longer horizon information as learning goes on, providing a further speed up to the learning speed. Because the layer normalization reordering causes a path where two linear layers are applied in sequence, in the new type of attention blocks described herein, a Rectified Linear Unit (ReLU) activation is applied to each submodule output before the residual connection.

The above techniques allow an attention neural network having the new type of attention blocks described herein to learn much faster and more reliably and exhibit significantly better final performance than canonical transformer neural networks.

It will be appreciated that the new type of attention block may be constructed from a combination of one or more of the transformations described above and may not require all of the above described transformations. The network architecture and operations of the new type of attention blocks (e.g., the attention block 124) are described in detail below with reference to FIG. 1.

As shown in FIG. 1, the attention block 124 includes an attention neural network layer 108 and a gating neural network layer 112. The attention block 124 is configured to receive an attention block input 104. The attention block input 104 may be embeddings from the output of a previous attention block in the attention neural network 110 or embeddings derived from the input sequence 102. For example, the attention neural network 110 includes an encoder neural network (e.g., an MLP network or a convolutional neural network) that generates, from the input sequence 102, embeddings (e.g. word embeddings in the case of language modeling or embeddings of per-timestep observations in a reinforcement learning environment) that are used as input by the first attention block of the attention neural network 110. As another example, the attention neural network 110 may generate the embeddings as input to the first attention block in a different way, e.g., by using a look-up table. The attention neural network layer 108 is configured to receive queries, keys and values that are derived from the attention block input 104 as attention layer input.

The queries, keys, and values can be different for different types of attention. That is, different types of attention neural network layers use different sources for the original queries, keys, and values that are received as input by the attention neural network layer 108.

In particular, when the attention neural network layer 108 is an encoder self-attention layer in an encoder that has multiple subnetworks, all of the keys, values and queries come from the same place, in this case, the output of the previous subnetwork in the encoder, or, for the encoder self-attention layer in the first subnetwork, the embeddings of the inputs and each position in the encoder can attend to all positions in the input order. Thus, there is a respective key, value, and query for each position in the input order.

When the attention neural network layer 108 is a decoder self-attention layer in a decoder that has multiple subnetworks, each position in the decoder attends to all positions in the decoder preceding that position. Thus, all of the keys, values, and queries come from the same place, in this case, the output of the previous subnetwork in the decoder, or, for the decoder self-attention layer in the first decoder subnetwork, the embeddings of the outputs already generated. Thus, there is a respective key, value, and query for each position in the output order before the current position.

When the attention neural network layer 108 is an encoder-decoder attention layer, the queries come from the previous component in the decoder and the keys and values come from the output of the encoder, i.e., from the encoded representations generated by the encoder. This allows every position in the decoder to attend over all positions in the input sequence. Thus, there is a respective query for each position in the output order before the current position and a respective key and a respective value for each position in the input order.

In some implementations, to initialize the attention block 124 to an identity operation, the attention block 124 may include a first layer normalization layer 106 configured to apply a layer normalization operation to the query input, the key input, and the value input to generate a normalized query input, a normalized key input, and a normalized value input. In these implementations, the attention neural network layer 108 receives the normalized query input, the normalized key input, and the normalized value input as the attention layer input.

Generally, layer normalization is used to improve training speeds for various neural network models. Unlike batch normalization which uses the distribution of a summed input to a neuron over a mini-batch of training cases to compute a mean and variance which are then used to normalize the summed input to that neuron on each training case, layer normalization computes the mean and variance used for normalization from all of the summed inputs to the neurons in a layer on a single training case. Layer normalization is described in detail in Jimmy Lei Ba, Jamie Ryan Kiros, and Geoffrey E Hinton. Layer normalization. arXiv preprint arXiv:1607.06450, 2016.

The attention neural network layer 108 is then configured to apply an attention mechanism to the attention layer input to generate an attention layer output for the attention neural network layer 108. In some implementations, the attention mechanism is a self-attention mechanism. In some other implementations, the attention mechanism is a masked self-attention mechanism. A masked self-attention mechanism is an attention mechanism that is masked so that it does not attend over or otherwise process any data that is not at a position preceding the current position in the attention layer input sequence.

For example, the attention layer output, denoted as $\bar{Y}^{(l)}$, can be computed from the attention block input 104, denoted as $E^{(l-1)}$, as follows:

$$\bar{Y}^{(l)}=\text{MultiHeadAttention}(\text{LayerNorm}([\text{StopGrad}(M^{(l-1)}), E^{(l-1)}])), \quad (5)$$

where $M^{(l-1)} \in \mathbb{R}^{L \times D}$ is an additional memory tensor which is treated as constant during weight updates, StopGrad( ) is a stop-gradient function that prevents gradients flowing backward during back-propagation, and MultiHeadAttention( ) is a basic multi-head attention mechanism, or a multi-head attention that uses relative position encodings. Unlike basic MHA operation that does not take sequence order into account explicitly because it is permutation invariant, position encodings take sequence order into account and can be used in domains like language where sequence order is an important semantic cue. Examples of position encodings are described in Zihang Dai, Zhilin Yang, Yiming Yang, Jaime Carbonell, Quoc Le, and Ruslan Salakhutdinov. Transformer-XL: Attentive language models beyond a fixed-length context. In Proceedings of the 57th Annual Meeting of the Association for Computational Linguistics, pp. 2978-2988, Florence, Italy, July 2019. Association for Computational Linguistics. doi: 10.18653/v1/P19-1285. URL https://www.aclweb.org/anthology/P19-1285.

The gating neural network layer 112 is configured to apply a gating mechanism to the attention block input and the attention layer output of the attention neural network layer 108 to generate a gated attention output. For example, the gating neural network layer 112 may apply a gating mechanism $g_{MHA}^{(l)}$ to the attention block input $E^{(l-1)}$ and the attention layer output $\bar{Y}^{(l)}$ of the attention neural network layer 108 to generate a gated attention output $Y^{(l)}$ as follows:

$$Y^{(l)}=g_{MHA}^{(l)}(E^{(l-1)}, \text{ReLU}(\bar{Y}^{(l)})), \quad (6)$$

where ReLU( ) is a ReLU activation applied to the attention layer output $\bar{Y}^{(l)}$. Examples of gating mechanism will be described in detail below.

In some implementations, the attention block 124 further includes a second layer normalization layer 114 configured to apply a second layer normalization operation to the gated attention output of the gating neural network layer 112 to generate a normalized-gated attention output. In these implementations, the attention block 124 may include one or more feedforward neural network layers 116 (e.g., a position-wise multi-layer network) configured to apply one or more transformations to the normalized-gated attention output to generate a temporary attention block output. For instance, the temporary attention block output can be denoted as $\bar{E}^{(l)}$ and computed as follows:

$$\bar{E}^{(l)}=f^{(l)}(\text{LayerNorm}(Y^{(l)})), \quad (7)$$

where LayerNorm( ) is the second layer normalization operation applied to the gated attention output $Y^{(l)}$, and $f^{(l)}$) denotes one or more transformations applied to the normalized-gated attention output LayerNorm($Y^{(l)}$) to generate the temporary attention block output $\bar{E}^{(l)}$. For example, the one or more transformations may include applying a 1×1 temporal convolutional network (i.e., kernel size 1, stride 1) to the normalized-gated attention output.

The attention block 124 may include a second gating neural network layer 118 configured to apply a second gating mechanism to the temporary attention block output and the gated attention output to generate a final attention block output 120 for the attention block 124. For example, second gating neural network layer 118 may apply a second gating mechanism $g_{MLP}^{(l)}$ to the temporary attention block output $\bar{E}^{(l)}$ and the gated attention output $Y^{(l)}$ of the gating neural network layer 112 to generate the final attention block output $E^{(l)}$ as follows:

$$E^{(l)}=g_{MLP}^{(l)}(Y^{(l)}, \text{ReLU}(\bar{E}^{(l)})), \quad (8)$$

where ReLU( ) is a ReLU activation applied to the attention block output $\bar{E}^{(l)}$.

It is noted that the residual connection in Equations 2 and 4 associated with the conventional transformer block of FIG. 2 are replaced with the gating neural network layer 112 and the second gating neural network layer 118 to improve performance and optimization stability of the resulting attention neural network.

There are a variety of gating mechanisms that could be applied by the gating neural network layer 112 and the second gating neural network layer 118. Generally, a gating mechanism computes a learned combination of the inputs to the gating neural network layer to generate a gated output for the gating neural network layer.

For example, in some implementations, the gating neural network layer 112 and/or the second gating neural network layer 118 may apply a sigmoid modulation σ( ) to the respective input stream x (e.g., the attention block input and/or the gated attention output) to generate a first sigmoid modulated output, and to combine the first sigmoid modulated output with the respective output stream y (e.g., the attention layer output and/or the temporary attention block output) to generate a gated output $g^{(l)}(x, y)$ (e.g., the gated attention output and/or the final attention block output) as follows:

$$g^{(l)}(x,y)=\sigma(W_g^{(l)}x) \odot x+y. \quad (9)$$

In some other implementations, the gating neural network layer 112 and/or the second gating neural network layer 118 may apply a sigmoid modulation σ( ) to the output stream y to generate a second sigmoid modulated output, and to combine the second sigmoid modulated output with the input stream x to generate a gated output as follows:

$$g^{(l)}(x,y)=x+\sigma(W_g^{(l)}x-b_g^{(l)}) \odot y. \quad (10)$$

In some other implementations, the gating neural network layer 112 and/or the second gating neural network layer 118 may use a highway connection that modulates both input and output streams with a sigmoid modulation, i.e., by computing a convex combination of the input and output streams using a sigmoid weighting to generate a gated output:

$$g^{(l)}(x,y)=\sigma(W_g^{(l)}x+b_g^{(l)}) \odot x+(1-\sigma(W_g^{(l)}x+b_g^{(l)})) \odot y. \quad (11)$$

where $W_g^{(l)}$ and $b_g^{(l)}$ are weights and $\odot$ denotes element-wise multiplication. In some implementations, initially setting $b_g^{(l)} > 0$ can greatly improve learning speed.

In some other implementations, the gating neural network layer 112 and/or the second gating neural network layer 118 may apply a sigmoid and a tan h activation on the output stream y to generate a sigmoid-tan h output, and to combine the sigmoid-tan h output with the input stream to generate a gated output:

$$g^{(l)}(x,y) = x + \sigma(W_g^{(l)} y - b) \odot \tan h(U_g^{(l)} y), \tag{12}$$

where $U_g^{(l)}$ is a weight.

In some implementations, the gating neural network layer 112 and/or the second gating neural network layer 118 may apply a Gated Recurrent Unit (GRU) on the input and output streams. The GRU is a recurrent network that performs similarly to a Long Short-Term Memory (LSTM) network with a forget gate but has fewer parameters than LSTM, as it lacks an output gate. In some implementations, this gating mechanism can be adapted as an untied activation function in depth. That means, while the GRU is a recurrent neural network (RNN), the gating mechanism can use the same formula that GRUs use to update their hidden states over time to instead update the skip connections at each gating neural network layer of the attention neural network 110. Thus, an update performed by the gating mechanism described herein could be viewed as an update of a GRU RNN which is unrolled over the depth of the network 110 instead of being unrolled over time. However, instead of having a single set of "tied" or "shared" parameters for each gating neural network layer for this GRU update (which would be the case when a single GRU RNN is used), there are different set of parameters for the GRU update at each gating neural network layer.

There are several variations on the full gated recurrent unit, with gating operation performed using a previous hidden state of the recurrent network and a bias in various combinations, and a simplified form called minimal gated unit as described below.

Fully Gated Recurrent Unit:

Initially, for t=0, the output vector is $h_0$=0.

$$z_t = \sigma_g(W_z x_t + U_z h_{t-1} + b_z)$$

$$r_t = \sigma_g(W_r x_t + U_r h_{t-1} + b_r)$$

$$\hat{h}_t = \phi_h(W_h x_t + U_h(r_t \odot h_{t-1}) + b_h)$$

$$h_t = (1 - z_t) \odot h_{t-1} + z_t \odot \hat{h}_t \tag{*}$$

where $x_t$ is an input vector, $h_t$ is an output vector, $\hat{h}_t$ is a candidate activation vector, $z_t$ is an update gate vector, $z_t$ is a reset gate vector, W, U and b are parameter matrices and vector. $\sigma_g$ is a sigmoid function and $\phi_h$ is a hyperbolic tangent. Alternative activation functions are possible, provided that $\sigma_g(x) \in [0,1]$. Alternative forms of Equations (*) can be created by changing $z_t$ and $r_t$.

Minimal Gated Recurrent Unit:

The minimal gated unit is similar to the fully gated unit, except the update and reset gate vector is merged into a forget gate. This also implies that the equation for the output vector must be changed.

$$f_t = \sigma_g(W_f x_t + U_f h_{t-1} + b_f)$$

$$\hat{h}_t = \phi_h(W_h x_t + U_h(f_t \odot h_{t-1}) + b_h)$$

$$h_t = (1 - f_t) \odot h_{t-1} + f_t \odot \hat{h}_t$$

where $x_t$ is an input vector, $h_t$ is an output vector, $\hat{h}_t$ is a candidate activation vector, $f_t$ is a forget vector, W, U and b are parameter matrices and vector.

The final attention block output 120 may be provided as input to the next attention block or other components of the attention neural network 110 for further processing, or may be used to generate the output 122 of the neural network system 100.

The attention neural network 110 may include one or more output layers that are configured to receive the output of the final attention block of the one or more attention blocks in the attention neural network 110. The one or more output layers are configured to process the output of the final attention block to generate the output 122 of the neural network system 100.

Figure 3:
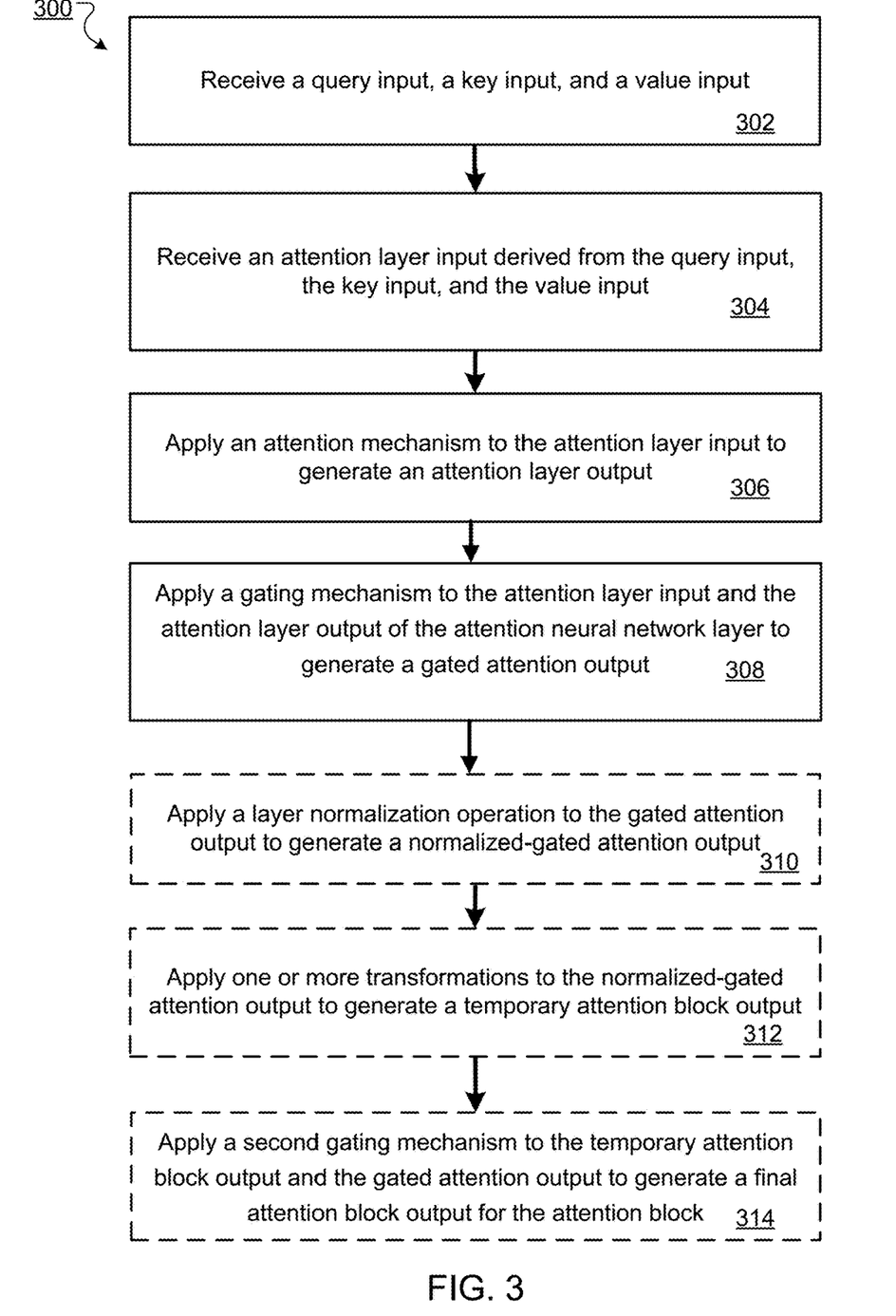
FIG. 3 is a flow diagram of an example process for generating an attention block output for an attention block from an attention block input.

FIG. 3 is a flow diagram of an example process for generating an attention block output for an attention block of an attention neural network from an attention block input. For convenience, the process 300 will be described as being performed by a system of one or more computers located in one or more locations. For example, a neural network system, e.g., neural network system 100 of FIG. 1, appropriately programmed in accordance with this specification, can perform the process 300.

The system receives a query input, a key input, and a value input that are derived from an attention block input (step 302). In some implementations, the system may derive the attention block input from an output of a previous attention block of the attention neural network. In some other implementations, the attention block input may be derived from an input sequence of a neural network system that includes the attention neural network. The derivation of the attention block input may be carried out in accordance with techniques described in the references cited above.

The system receives, by an attention neural network layer of an attention block, an attention layer input derived from the query input, the key input, and the value input (step 304).

In some implementations, to initialize the attention block to an identity operation, the system applies, using a first layer normalization layer of the attention block, a layer normalization operation to the attention block input including the query input, the key input, and the value input to generate a normalized query input, a normalized key input, and a normalized value input. In these implementations, the attention neural network layer receives the normalized query input, the normalized key input, and the normalized value input as the attention layer input.

The system applies, using the attention neural network layer, an attention mechanism to the attention layer input to generate an attention layer output for the attention neural network layer (step 306). In some implementations, the attention mechanism is a self-attention mechanism. In some other implementations, the attention mechanism is a masked self-attention mechanism.

The system applies, using a gating neural network layer of the attention block, a gating mechanism to the attention block input and the attention layer output of the attention neural network layer to generate a gated attention output (step 308).

In particular, in some implementations, applying a gating mechanism includes applying a sigmoid modulation to the attention layer input to generate a first sigmoid modulated output, and combining the first sigmoid modulated output with the attention layer output to generate the gated attention output.

In some other implementations, applying a gating mechanism includes applying a sigmoid modulation to the attention layer output to generate a second sigmoid modulated output, and combining the second sigmoid modulated output with the attention layer input to generate the gated attention output.

In some other implementations, applying a gating mechanism includes computing a convex combination of the attention layer input and the attention layer output using a sigmoid weighting to generate the gated attention output.

In some other implementations, applying a gating mechanism includes applying a sigmoid and a tan h activation on the attention layer output to generate a sigmoid-tan h output, and combining the sigmoid-tan h output with the attention layer input to generate the gated attention output.

In some other implementations, applying a gating mechanism includes applying a gated recurrent unit (GRU) to the attention layer input and the attention layer output. The GRU is a recurrent network that performs similarly to a Long Short-Term Memory (LSTM) network but has fewer parameters. This gating mechanism can be adapted as an untied activation function in depth.

In some implementations, the system applies, using a second layer normalization layer of the attention block, a layer normalization operation to the gated attention output to generate a normalized-gated attention output (step 310).

In some implementations, the system applies, using a feedforward neural network layer of the attention block, one or more transformations to the normalized-gated attention output to generate a temporary attention block output (step 312). For example, the one or more transformations may include applying a 1×1 temporal convolutional network (i.e., kernel size 1, stride 1) to the normalized-gated attention output.

In some implementations, the system applies, using a second gating neural network layer of the attention block, a second gating mechanism to the temporary attention block output and the gated attention output to generate an attention block output for the attention block (step 314).

The system may provide the attention block output as input to the next attention block or other components of the attention neural network for further processing. If the attention block is the final attention block in the attention neural network, the system may provide the attention block output to one or more output layers of the attention neural network that are configured to map the attention block output to the output of the system.

The attention neural network described in this specification can be trained on training data using conventional machine learning techniques (e.g., backpropagation) to optimize an objective function that is appropriate for the task the attention neural network is configured to perform. By replacing a residual connection in conventional attention blocks with a gating function and by modifying how a layer normalization operation is applied within an attention block to allow the attention block to be initialized to an identity operation at the beginning of training, the techniques described in this specification allow the training of the attention neural network to become much more stable and improve learning speeds (compared to the training of conventional attention neural networks having conventional attention blocks).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system comprising one or more computers and one or more storage devices storing instructions that, when executed by the one or more computers, cause the one or more computers to implement an attention neural network that is configured to receive a network input and to process the network input to generate an output, the attention neural network comprising:
an attention block configured to receive a query input, a key input, and a value input that are derived from an attention block input, the attention block comprising:
an attention neural network layer configured to:
receive an attention layer input derived from the query input, the key input, and the value input, and apply an attention mechanism to the attention layer input to generate an attention layer output for the attention neural network layer; and
a gating neural network layer configured to apply a gating mechanism to the attention block input and the attention layer output of the attention neural network layer to generate a gated attention output.

2. The system of claim 1, wherein the attention block further comprises a first layer normalization layer configured to apply a layer normalization operation to the query input, the key input, and the value input to generate a normalized query input, a normalized key input, and a normalized value input, and wherein the attention layer input comprises the normalized query input, the normalized key input, and the normalized value input.

3. The system of claim 1, wherein applying the gating mechanism on the attention block input and the attention layer output comprises:
applying a sigmoid modulation to the attention block input to generate a first sigmoid modulated output; and
combining the first sigmoid modulated output with the attention layer output to generate the gated attention output.

4. The system of claim 1, wherein applying the gating mechanism on the attention block input and the attention layer output comprises:
applying a sigmoid modulation to the attention layer output to generate a second sigmoid modulated output, and
combining the second sigmoid modulated output with the attention block input to generate the gated attention output.

5. The system of claim 1, wherein applying the gating mechanism on the attention block input and the attention layer output comprises: computing a convex combination of the attention block input and the attention layer output using a sigmoid weighting to generate the gated attention output.

6. The system of claim 1, wherein applying the gating mechanism on the attention block input and the attention layer output comprises:
applying a sigmoid and a tan h activation on the attention layer output to generate a sigmoid-tan h output, and combining the sigmoid-tan h output with the attention block input to generate the gated attention output.

7. The system of claim 1, wherein applying the gating mechanism on the attention block input and the attention layer output comprises:
applying a gated recurrent unit on the attention block input and the attention layer output.

8. The system of claim 1, wherein the attention block further comprise:
a second layer normalization layer configured to apply a second layer normalization operation to the gated attention output to generate a normalized-gated attention output,
one or more feedforward neural network layers configured to apply one or more transformations to the normalized-gated attention output to generate a temporary attention block output, and
a second gating neural network layer configured to apply a second gating mechanism to the temporary attention block output and the gated attention output to generate a final attention block output for the attention block.

9. The system of claim 1, wherein the attention mechanism is a self-attention mechanism.

10. The system of claim 1, wherein the attention mechanism is a masked self-attention mechanism.

11. One or more non-transitory computer storage media storing instructions that, when executed by one or more computers, cause the one or more computers to perform operations for processing an attention block input of an attention block of an attention neural network, the operations comprising:
receiving a query input, a key input, and a value input that are derived from the attention block input;
receiving, by an attention neural network layer of an attention block, an attention layer input derived from the query input, the key input, and the value input;
applying, using the attention neural network layer, an attention mechanism to the attention layer input to generate an attention layer output for the attention neural network layer; and
applying, using a gating neural network layer of the attention block, a gating mechanism to the attention block input and the attention layer output of the attention neural network layer to generate a gated attention output.

12. The one or more non-transitory computer storage media of claim 11, wherein the operations further comprise:
applying a layer normalization operation to the query input, the key input, and the value input to generate a normalized query input, a normalized key input, and a normalized value input, and wherein the attention layer input comprises the normalized query input, the normalized key input, and the normalized value input.

13. The one or more non-transitory computer storage media of claim 11, wherein the operations further comprise:
applying a second layer normalization operation to the gated attention output to generate a normalized-gated attention output;
applying one or more transformations to the normalized-gated attention output to generate a temporary attention block output; and
applying, using a second gating neural network layer of the attention block, a second gating mechanism to the temporary attention block output and the gated attention output to generate an attention block output for the attention block.

14. A computer-implemented method for processing an attention block input of an attention block of an attention neural network, the method comprising:

receiving a query input, a key input, and a value input that are derived from the attention block input;

receiving, by an attention neural network layer of an attention block, an attention layer input derived from the query input, the key input, and the value input;

applying, using the attention neural network layer, an attention mechanism to the attention layer input to generate an attention layer output for the attention neural network layer; and applying, using a gating neural network layer of the attention block, a gating mechanism to the attention block input and the attention layer output of the attention neural network layer to generate a gated attention output.

15. The method of claim 14, wherein applying the gating mechanism on the attention block input and the attention layer output comprises:

applying a sigmoid modulation to the attention block input to generate a first sigmoid modulated output; and combining the first sigmoid modulated output with the attention layer output to generate the gated attention output.

16. The method of claim 14, wherein applying the gating mechanism on the attention block input and the attention layer output comprises:

applying a sigmoid modulation to the attention layer output to generate a second sigmoid modulated output, and combining the second sigmoid modulated output with the attention block input to generate the gated attention output.

17. The method of claim 14, wherein applying the gating mechanism on the attention block input and the attention layer output comprises: computing a convex combination of the attention block input and the attention layer output using a sigmoid weighting to generate the gated attention output.

18. The method of claim 14, wherein applying the gating mechanism on the attention block input and the attention layer output comprises:

applying a sigmoid and a tan h activation on the attention layer output to generate a sigmoid-tan h output, and combining the sigmoid-tan h output with the attention block input to generate the gated attention output.

19. The method of claim 14, wherein applying the gating mechanism on the attention block input and the attention layer output comprises:

applying a gated recurrent unit on the attention block input and the attention layer output.

20. The method of claim 14, further comprising:

applying a layer normalization operation to the gated attention output to generate a normalized-gated attention output;

applying one or more transformations to the normalized-gated attention output to generate a temporary attention block output; and applying, using a second gating neural network layer of the attention block, a second gating mechanism to the temporary attention block output and the gated attention output to generate an attention block output for the attention block.

* * * * *